April 9, 1957

V. E. McCARTY 2,788,401

IGNITION TIMER

Filed Aug. 26, 1953

INVENTOR.
Verle E. McCarty

BY

Attorney

April 9, 1957 V. E. McCARTY 2,788,401
IGNITION TIMER

Filed Aug. 26, 1953 2 Sheets-Sheet 2

INVENTOR.
Verle E. McCarty
BY
Attorney

United States Patent Office 2,788,401
Patented Apr. 9, 1957

2,788,401

IGNITION TIMER

Verle E. McCarty, Anderson, Ind., assignor to General Motors Corporation, Detroit, Mich., a corporation of Delaware Application August 26, 1953, Serial No. 376,626

15 Claims. (Cl. 200—30)

This invention relates to ignition timers for a motor vehicle engine and has for an object to provide circuit breaker mechanism automatically adjustable for timing the ignition suitable for changing conditions, and an object is to eliminate lost motion, wobble, and other unwanted movements so that ignition timing can be adjustably controlled with great fidelity. This is accomplished by journalling a movable breaker plate assembly within a fixed support plate, and providing a ring or circular bearing in line contact between the two plates so that rocking and cocking of the breaker plate is eliminated. The ring-like bearing of nylon, or other suitable material is supported by the breaker plate, the ring bearing having a crowned face continuously engageable with a flat ground area on the support plate. The two plates are held in assembly by a split corrugated spring ring cooperating with the journal bearing, and lateral movement between the plates is reduced by a spring leaf between the surface of the journal which spring is so located that it forces the breaker plate assembly laterally of the bearing and in the same direction that force is applied to the circuit breaker mechanism by the rotating cam. Wear of the assembly is reduced to a minimum by means of an oil absorbing member, such as hard felt disposed between the plates, which acts as a reservoir from which sufficient lubrication or sufficient flow of lubricant is available for the journal bearing and for the ring bearing between the plates at the outer periphery.

Further objects and advantages of the present invention will be apparent from the following description reference being had to the accompanying drawings wherein a preferred embodiment of the present invention is clearly shown.

Figure 1:
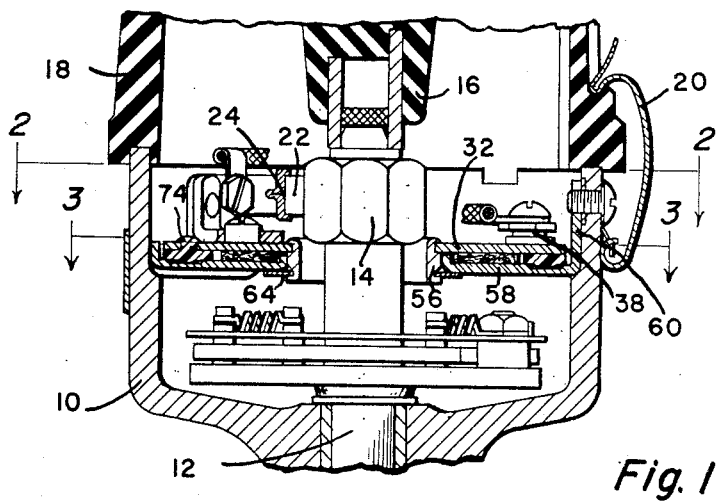
Fig. 1 is a vertical section of an ignition timer incorporating the instant invention, the view being substantially as indicated by the line and arrows 1—1 of Fig. 2.
Figure 2:
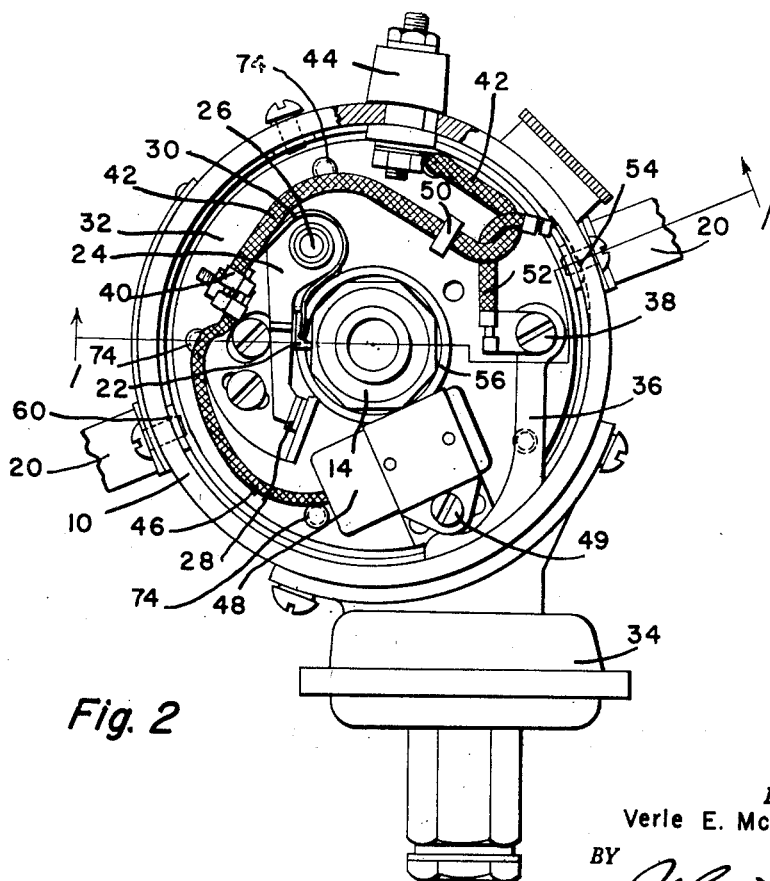
Fig. 2 is a plan view of a timer mechanism with the cap removed, it being a view substantially as indicated by the line and arrows 2—2 of Fig. 1.
Figure 3:
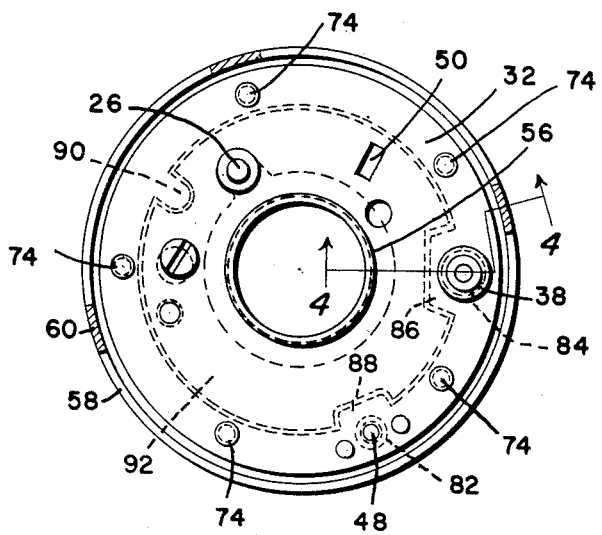
Fig. 3 is a plan view of the circuit breaker assembly with the circuit breaker parts removed, it being a view substantially as indicated by the line and arrows 3—3 of Fig. 1.

Referring particularly to the drawings and first, with respect to Figs. 1 and 2, 10 refers to a cup-like housing for an ignition timer, in which is journalled a shaft 12 driving cam 14 and a conventional rotor 16 enclosed by cap 18 held in assembly with the housing by spring clips 20. The rotating cam 14 periodically engages a rubbing block 22 of a breaker lever 24 pivotally supported at 26, and urged to close contacts 28 by a spring 30. The pivot 26 and one of the contacts 28 are supported by a rotatable plate 32, which plate is automatically movable by vacuum unit 34 which has a link 36 pivotally connected at 38 with the plate 32. As seen with respect to Fig. 2, the point of attachment of 38 to the breaker plate is diametrically opposed to the point of engagement where rubbing block 22 is engaged by the lobes of cam 14. This engagement oscillates the breaker lever 24 about the pivot post 26 against the force of spring 30 anchored at a lug 40, which lug also supports, in insulated fashion, an electrical lead 42 connecting with a terminal 44 in the primary circuit, and also a lead 46 connecting with one plate of the condenser 48 connected with the breaker plate 32 at 49. A strain relief 50 secured to the breaker plate provides an intermediate support for the lead 42. A grounding lead 52 connects with the pivot point 38 and the rim of housing 10 at 54, insuring that the rotatable breaker plate 32 is grounded.

Figure 4:
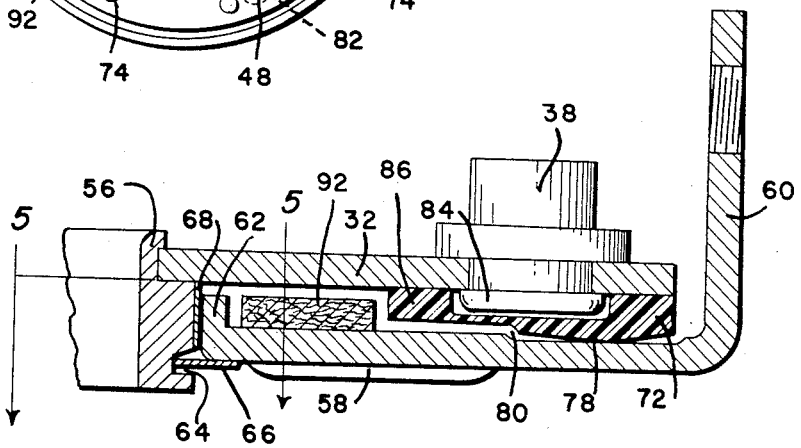
Fig. 4 is an enlarged sectional view of the circuit breaker assembly substantially as indicated by the line and arrows 4—4 of Fig. 3.

The circuit breaker plate 32 is centrally apertured where it is secured to a bearing bushing 56 as shown in Fig. 4. The bushing 56 is journalled in a central opening of a stationary plate 58. The opening in plate 58 is defined by an annular flange 62 having an internal, cylindrical bearing surface concentric with the shaft 12.

The plate 58 is supported within the housing 10. In this instance the plate 58 has three ears 60 having threaded apertures to receive threaded ends of screws which secure the plate 58 to the housing. Two of the screws attach brackets on the exterior of housing 10. These brackets hingedly support the spring clips 20 which hold the cap 18 on top of housing 10.

Figure 5:
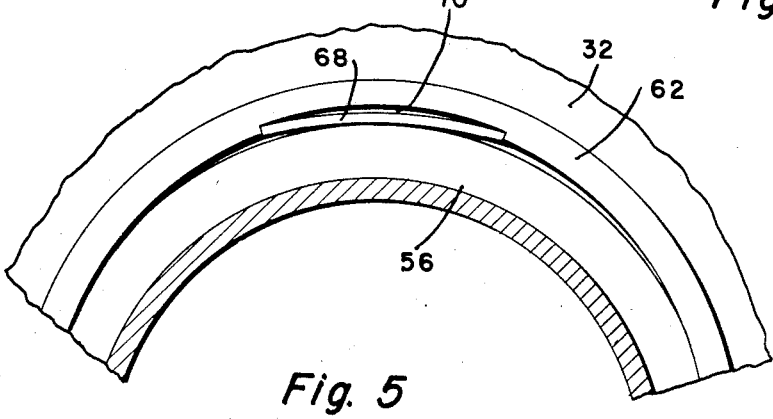
Fig. 5 is a plan view of the plate assembly substantially as indicated by the line and arrows 5—5 of Fig. 4.

The flange 62 of plate 58 has an arcuate recess, Fig. 5, extending inwardly from the bearing surface of the flange 62 and receiving a leaf spring 68. The spring 68 is initially flat, but when it is placed in the recess 70 and between the bearing bushing 56 and the flange 62, its mid portion is pressed against the bearing bushing 56 and its end portions press against the flange 62 thus urging the bushing 56 downwardly as viewed in Fig. 5. The bearing bushing is retained within the bearing flange 62 by a C-washer 66 received by a perimetrical groove 64. Since this spring is located substantially in line between the pivotal point 38 and the rubbing block and cam engagement, there is a tendency to move the breaker plate 32 in the same direction as the force applied by the cam 14 against the rubbing block 22 of the circuit breaker. This eliminates chatter and lateral movement of breaker plate due to cam operation.

The journal bearing between the plates 32 and 58 is such that the plates are spaced sufficiently to receive therebetween a bearing ring 72 of such large diameter as to engage between the plates near the periphery thereof. This ring 72 is preferably of nylon and is supported by the breaker plate 32 by spaced bosses 74 extending through suitable apertures provided by the breaker plate 32 where the ends of the stems are not upset. The radial section of the bearing ring 72 is crowned, or radially curved, such as to provide engagement with the support plate 58 along a continuous circular line 78, substantially concentric with the journal bearing between the plates. The support plate 58 has an area 80 ground to dimension to provide a flat annular surface against which the face of the ring 72 bears. The nylon ring is apertured or recessed as at 84 to provide clearance for extensions from breaker plate 32, due to mounting the condenser and pivot post for the vacuum shifter linkage 38. Since these apertures would weaken the ring, lateral extensions 86, 88 provide additional cross section, and along with radial inward extension 90, provide adequate means for a driving connection with the hard felt washer 92 disposed within the ring 72 and between the plates 32 and 58 as a lubricant retaining device.

While the embodiment of the present invention as herein disclosed, constitutes a preferred form, it is to be understood that other forms might be adapted.

What is claimed is as follows:

1. In a timer distributor mechanism, the combination comprising, a cup-like housing, a cam shaft journalled in said housing, a circuit breaker assembly supported in the housing and operable by the cam shaft, said assembly including a support plate centrally apertured about said cam shaft, a breaker plate having a bearing sleeve extending through the aperture of the support plate, a bearing ring carried by the breaker plate and having a bearing surface concentric with the support plate, an oil supporting ring disposed between said plates, yieldable means engaging the support plate and the bearing sleeve tending to hold the plates together, and spring means exerting a radial thrust between the support plate and bearing sleeve to prevent rocking or cocking of the breaker plate.

2. In a timer-distributor mechanism, the combination comprising, a cup-like housing, a cam shaft journalled in said housing, a circuit breaker assembly supported by the housing and centrally apertured concentric with the end of said cam shaft, said assembly comprising a support plate having a central flanged opening and a flat wall concentric therewith, said flat wall having an annular area concentric with the flange ground to provide an annular bearing surface, a breaker plate providing a central bearing sleeve extending through the flanged opening of the support plate and ending in an annular groove, a split corrugated spring ring disposed in the annular groove and engaging the support plate for retaining the support plate and breaker plate in assembly, a nonconducting bearing ring secured to the breaker plate and engaging with line contact the surface of the support plate, and yieldable means exerting side thrust on the breaker plate with respect to the support plate.

3. In a timer-distributor mechanism, the combination comprising, a cup-like housing, a cam shaft journalled in said housing, a circuit breaker assembly secured within the housing and centrally apertured to permit the extension of said cam shaft therethrough, said assembly comprising a support plate having a flat portion extending across the housing, a breaker plate rotatable about the cam shaft with respect to said support plate and a bearing ring secured to one of the plates near the peripheral edge thereof, a bearing sleeve secured to one of the plates and extending through the other of said plates, providing an annular groove therein, spring means disposed in the said groove and overlapping the central edge of one of said plates for yieldably securing the plates in assembly and side pressure spring cooperating with the bearing sleeve and one of said plates for eliminating side thrust between the said plates due to circuit breaker operation or breaker plate movement.

4. In an ignition timer, a fixed support plate, a movable breaker plate, means providing a journal bearing for movably securing the breaker plate to the support plate, a spring urged breaker lever pivotally supported by the breaker plate, a rotatable cam operable to actuate the breaker lever radially with respect to the journal bearing, a bearing ring supported by the breaker plate and engaging the support plate radially outward of and concentric with said bearing means, and biasing means incorporated in the bearing means for minimizing lateral movement of the breaker plate during cam operation of the circuit breaker lever.

5. In an ignition timer, a fixed support plate, a breaker plate journalled upon the support plate for limited rotary movement for adjustment of the timer, spring means operable to urge the breaker plate laterally of its journalled support, a circuit breaker lever having a rubbing block disposed diametrically opposite said spring means, a multi-lobe cam engageable with the rubbing block for actuating said breaker lever, and a bearing ring of relatively large diameter disposed between said plates preventing rock and tilt of the breaker plate relative to the support plate.

6. In an ignition timer, a fixed support plate, a breaker plate rotatable with respect thereto a bearing ring carried by the breaker plate and engageable with the support plate, and yieldable means for urging the bearing ring into engagement with the support plate in a plane parallel to the plane of the plates for reducing lateral movement of one plate with respect to the other plate.

7. In an ignition timer, a circuit breaker assembly including a relative fixed supporting plate, a breaker plate rotatably supported by said support plate, said rotatable support including a journal bearing of relatively small diameter, a face bearing of relatively large diameter concentric therewith, yieldable means cooperable with the supporting plate and the journal bearing for yieldably urging one of said plates laterally with respect to the other of said plates whereby the face bearing engagement for all rotative positions of the breaker plate relative to the supporting plate is maintained.

8. In an ignition timer, a fixed support plate, a movable breaker plate, means providing a journal bearing for rotatably securing the breaker plate upon the support plate, a spring urged breaker lever pivotally supported by the breaker plate, a rotatable cam effecting movement radial of said journal bearing and operable to actuate the breaker lever, means providing a ring bearing engagement between the plates and concentric of the journal bearing, and biasing means incorporated in the journal bearing effecting a radial force upon the breaker plate in the same direction as the cam effected movement operable on the breaker lever.

9. The combination set forth in claim 4 wherein, the means providing the ring bearing comprises a large diameter ring rotatable by the breaker plate, and provides a radial convex surface engageable with a machined area of the fixed support plate.

10. The combination set forth in claim 4 wherein, the biasing means for minimizing the lateral movement of the breaker plate includes, a flat leaf spring extending cordwise between the surfaces of the journal bearing.

11. The combination set forth in claim 4, wherein, the biasing means for minimizing the lateral movement of the breaker plate comprises an arcuate notch in one of the members of the journal bearing, and a straight leaf spring disposed in said notch cordwise of said journal bearing.

12. The combination set forth in claim 5 wherein, the spring means urging lateral movement of the breaker plate includes a free leaf spring extending cordwise between the cooperating surfaces of the journal bearing, and is effective on the breaker plate in the same direction as the force applied by the cam to the rubbing block of the circuit breaker.

13. In an ignition timer, a fixed support plate, a breaker plate journalled upon the support plate for limited rotary movement for adjustment of the timer, spring means operable to urge the breaker plate laterally of its journalled support, a circuit breaker lever having a rubbing block disposed diametrically opposite said spring means, a multi-lobe cam effecting a force upon the rubbing block radially of said journal bearing in the same direction as the spring force applied to the breaker plate, and periodically engageable with the rubbing block for actuating the breaker lever, means providing a face bearing between the plates of relatively large diameter and concentric with the journal bearing, and means maintaining the face bearing in engagement so that rocking and tilting of the breaker plate is eliminated.

14. An ignition timer, a fixed support plate, a breaker plate rotatable with respect thereto, means providing a journal bearing for the breaker plate upon the support plate, means providing a ring-like engagement between the plates and concentric with the journal bearing, and yieldable means acting between the plates adjacent the journal bearing for laterally shifting one plate relative to the other plate for maintaining constant engagement of at least a portion of said plates at the journal bearing.

15. The combination set forth in claim 8 wherein, the means providing ring bearing engagement comprises a nylon ring anchored to the breaker plate for rotation therewith and having a radially convex surface engageable with said support plate.

References Cited in the file of this patent
UNITED STATES PATENTS

| | | |
|---|---|---|
| 2,348,236 | Arthur | May 9, 1944 |
| 2,390,050 | Bales | Dec. 4, 1945 |
| 2,610,264 | Fitzsimmons | Sept. 9, 1952 |
| 2,730,583 | Brunk | Jan. 10, 1956 |